June 9, 1959     E. B. MILLER     2,889,683
WATER HEATING SYSTEM FOR PROVIDING HOT WATER FOR SULPHUR MINING
Filed Jan. 28, 1957     2 Sheets-Sheet 1

INVENTOR
ERNEST B. MILLER
BY Adams + Bush
ATTORNEY

June 9, 1959 — E. B. MILLER — 2,889,683
WATER HEATING SYSTEM FOR PROVIDING HOT WATER FOR SULPHUR MINING
Filed Jan. 28, 1957 — 2 Sheets-Sheet 2
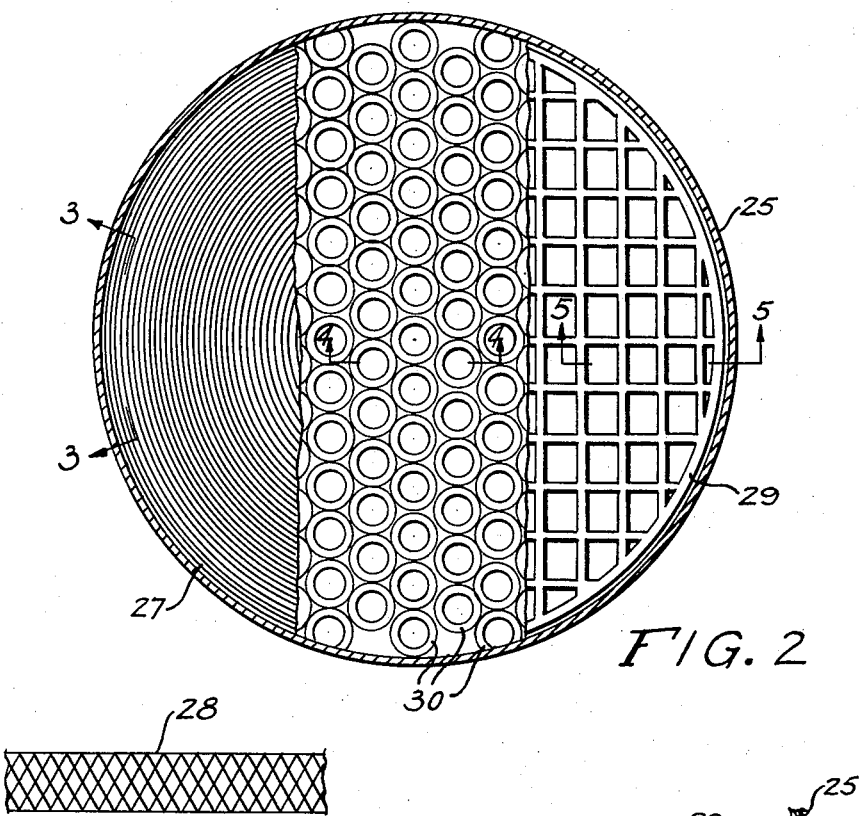
FIG. 2
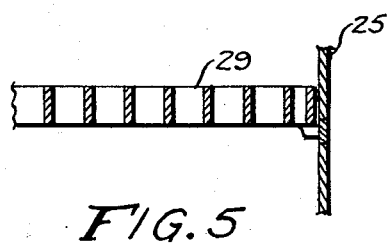
FIG. 3
FIG. 5
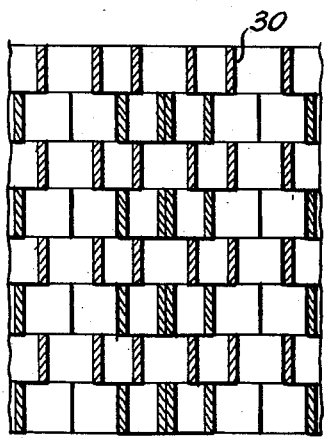
FIG. 4
INVENTOR
ERNEST B. MILLER
BY Adams + Bush
ATTORNEY United States Patent Office 2,889,683
Patented June 9, 1959

2,889,683
WATER HEATING SYSTEM FOR PROVIDING HOT WATER FOR SULPHUR MINING

Ernest B. Miller, Houston, Tex., assignor to Jefferson Lake Sulphur Company, New Orleans, La., a corporation of New Jersey Application January 28, 1957, Serial No. 636,815

3 Claims. (Cl. 60—39.57)

This invention relates to apparatus for heating water and has more particular reference to a water heating system for heating large quantities of water for use in mining sulphur and in other commercial operations.

One object of the present invention is to provide a novel and improved water heating system for economically heating large quantities of water, employing submerged combustion burners having enormous water heating capacity in proportion to the size of the equipment so that it can be dismantled and transported from one location to another at a minimum expense.

Another object of the invention is to provide a novel and improved water heating system, as characterized above, wherein a submerged combustion burner is employed to heat the water under pressure in a heating tank and the products of combustion or flue gases from the heating tank pass through a stripper, where the condensable water vapor is removed and returned to the heating tank, and the flue gases, after having all condensable water vapor removed therefrom, after passing through a heater, are employed to drive a gas turbine or motor, and a compressor which supplies air to the burner, and wherein the exhaust gases from the turbine are employed to preheat feed water supplied to the system.

A further object of the invention is to provide a novel and improved water heating system which is economical and efficient in operation.

Other objects and advantages of the invention will appear in the following specification when considered in connection with the accompanying drawings, wherein:

Fig. 2 is a horizontal sectional view, taken on the line 2—2 of Fig. 1;

Fig. 3 is a detailed sectional view, taken on the line 3—3 of Fig. 2;

Fig. 4 is a vertical sectional view, taken on the line 4—4 of Fig. 2; and

Fig. 5 is a detailed vertical sectional view, taken on the line 5—5 of Fig. 2.

Figure 1:
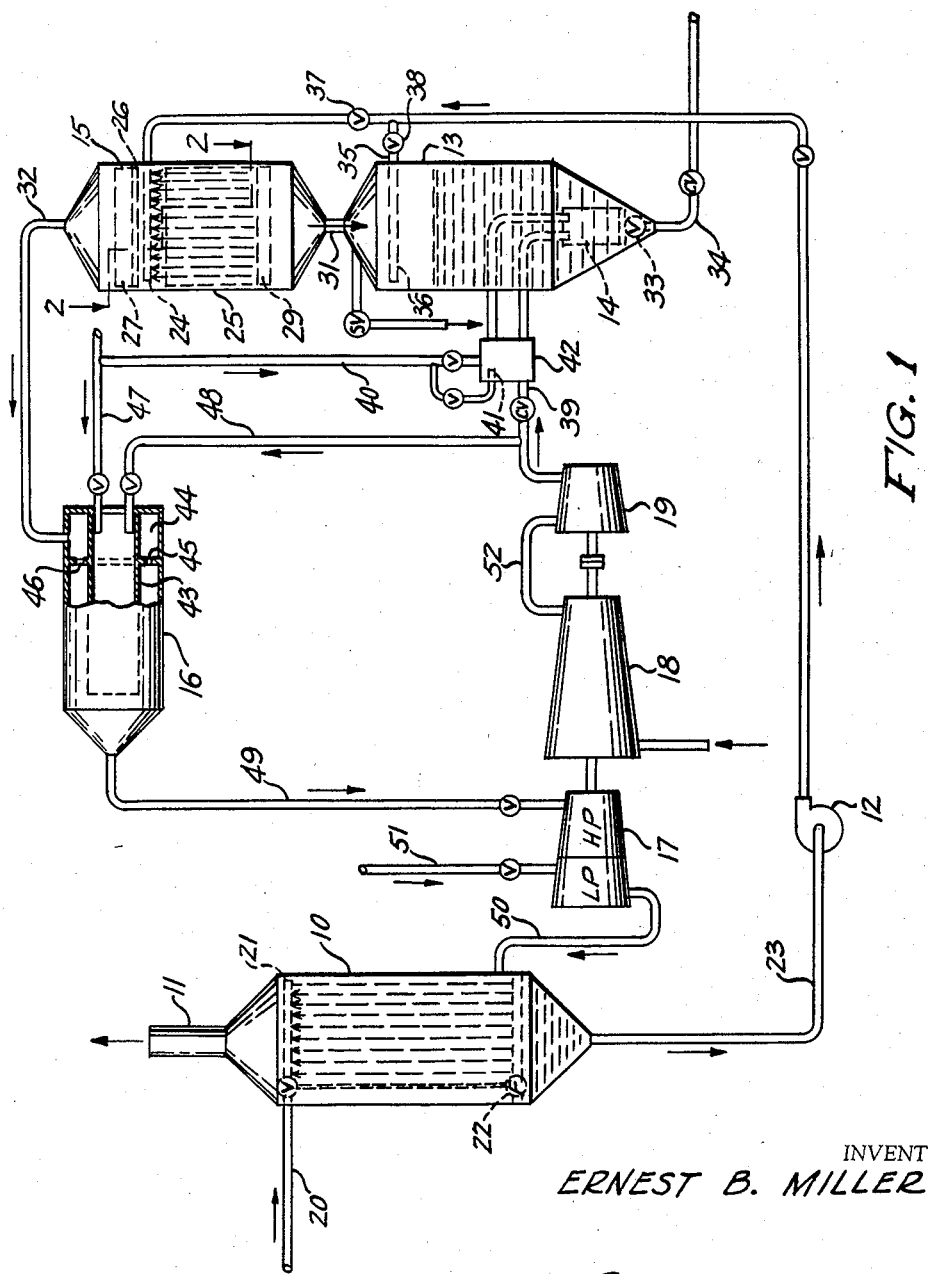
Fig. 1 is a diagrammatic view or schematic diagram of apparatus embodying the invention.

The water heating system of the present invention is an improvement over that shown in my application, Ser. No. 447,285, filed August 2, 1954, now abandoned, for Water Heating System.

Referring now to the drawings, there is illustrated, in Fig. 1, one embodiment of a water heating system constructed in accordance with the present invention. As there shown, the system comprises a vertical preheating or economizer tank 10 having an open outlet flue 11 at its upper end; a water pump 12; a vertical heating tank 13 having a submerged burner 14 therein; a stripper tank 15 mounted above the heating tank 13 for removing the condensable water vapor from the products of combustion from the heating tank; a heater 16 for heating the products of combustion after the condensable water vapor has been removed therefrom; a gas turbine 17; a first stage air compressor 18; and a second stage air compressor 19.

The operation of the system is believed apparent.

Feed water is supplied to the preheating tank 10 by a pipe line 20 having a sprayer head 21 in the upper portion of the tank. The water level in the lower portion of the tank 10 may be maintained by a control valve operated by a float 22.

The preheated water is delivered from the bottom of the economizer tank 10 through a pipe 23 by the pump 12 to a sprayer head 24 in the stripper tank 15. The stripper tank 15 may be of any suitable type. In the particular embodiment illustrated, it is shown as comprising a cylindrical tank 25 having conically shaped top and bottom walls; an upper grid 26 supporting a demister 27 in the form of a wire mesh 28 wound into a pancake; a lower grid 29 supporting a plurality of horizontal layers of short, upright, open-ended cylindrical members 30, with the cylindrical members in the respective layers staggered to form tortuous passageways through the several layers; a connection pipe 31 connecting the bottom of the tank 25 to the heating tank 13; and an outlet pipe 32 for the flue gases.

The water delivered into the stripper tank 15, through the sprayer head 24 therein, passes downwardly through the tortuous passageways formed by the layers of cylindrical members 30 into the bottom of the tank and pass through connection pipe 31, into the heating tank 13, wherein the water is maintained under pressure. The water level may be maintained in the lower portion of this tank by a float valve 33 which controls the discharge to a delivery pipe 34 leading to a point of use. However, the discharge pipe may be connected to the tank 13 at the desired level, in which case the float valve may be omitted.

In order to control the amount of water passing through the stripper tank so as not to cool the flue gasses passing therethrough too much and, at the same time, maintain the proper water level in the heating tank 13, a bypass pipe 35, connected to the pipe 23 which supplies the water to the spray head 24 in the stripper tank, is connected to a spray head 36 mounted in the upper end portion of the heating tank 13. Suitable valves 37, 38, located in the spray heads 24 and 36, respectively, provide means for controlling the flow of water through the respective spray heads. By suitable adjustment of the valves 37 and 38, the quantity of water going into the stripper tank can be controlled so as to maintain the outlet temperature of the gases of combustion passing into pipe 32 from the stripper tank at a suitable constant temperature, preferably of about 240° F.

The water in the heating tank 13 is heated by the submerged gas burner 14, which is supplied with air under pressure through a conduit 39, gas being delivered through a valved gas line 40. The gas is adapted to be ignited in a well known manner. In the particular embodiment illustrated, it is shown as being ignited by a pilot burner 41 within a housing 42. Flames from the burner 14 are quenched by the water in the bottom portion of the tank 13 and the hot products of combustion discharge upwardly and pass through connection pipe 31 into the stripper tank 15 and pass upwardly through the tortuous passageways formed by the layers of cylindrical members 30 through the demister 27 and out of the stripper tank through pipe 32. As the hot products of combustion pass through the stripper tank all condensable water vapor carried therewith is removed and passed downwardly into the heating tank with the water from the sprayer head 24. The gases of combustion, after having all condensable water vapor removed therefrom in the stripper tank pass through pipe line 32 to the heater 16.

The heater 16 may be of any suitable usual type. In the particular embodiment illustrated, it is shown as comprising a horizontal cylindrical member having an elongaged concentrically mounted combustion tube 43 extending inwardly from the forward end of the heater.

An annular chamber 44 is formed in the forward end portion of the heater 16 by an annular plate 45 mounted on the combustion tube 43. The plate 45 is provided with a plurality of circumferentially spaced openings 46. Gas for use in the combustion tube 43 of the heater 16 is supplied by a valved branch pipe line 47 connected to the gas supply pipe line 40, and air is supplied by a valved branch pipe line 48 connected to the air line 39 which supplies compressed air to the submerged burner.

The products of combustion from the submerged burner delivered to the heater through conduit 32 enter the chamber 44 and pass through the opening 46 in the annular plate 45 and mix with the products of combustion from the combustion tube 43. From the heater 16 the mixed products of combustion are delivered through a conduit 49 connected to drive the gas turbine 17 which drives the air compressors 18 and 19. Of course, the turbine may be used to drive the water pump 12 and other auxiliary equipment. Exhaust gas from the turbine is discharged through an exhaust conduit 50 to the economizer tank 10, above the water level therein, to exchange its heat directly with the water spray.

Obviously, the gas turbine may be started by an ordinary electric motor, or by a gas engine, when steam is not available. In this example, the turbine is of the well known twin or mixed fluid type adapted to be started by steam and then driven by the hot flue gases. Steam is supplied for starting it through a steam conduit 51.

Air compressed in the first stage compressor 18 passes through conduit 52 into the second stage air compressor 19. From the second stage air compressor 19, the highly compressed air passes through conduit 39 and branch conduit 48 to the burners for the heating tank 13 and heater 16, respectively.

In the operation of the system, for mining sulphur, for example, the feed water is preheated to a temperature of about 100° F. by the exhaust gases from the turbine. The water in the heating tank 13 is heated to about 320° F. and the pressure in the tank is maintained at about 120 pounds gauge by the air compressor. The first stage air compressor delivers air at about 20 pounds gauge and the second stage air compressor delivers air at about 120 pounds gauge.

The flue gases from the heating tank 13 are reheated in the heater 16 to a temperature slightly above 1000° F. and are mixed with the products of combustion in the heater 16 with the mixed gases of combustion delivered to the turbine at high pressure. The hot water is discharged from the heating tank under its own pressure.

It will be understood that the water may be heated to any desired temperature in a system of this type. The final temperature will depend upon the pressure in the tanks, the capacity of the submerged burner, and the rate of flow of the water through the system.

From the foregoing, it readily will be seen that the invention provides a heating system of maximum thermal efficiency, in which the flue gases from the heating tank, after having substantially all of the condensable water vapor removed therefrom in the stripping tank, pass at controlled temperature into a direct heater, where they are directly heated by and mixed with the products of combustion in the heater, which results in producing a driving gas for the turbine having a temperature and pressure sufficiently high to operate the turbine at maximum speed to produce in the two stage air compressor driven thereby, an extremely high compression of the air used in the system. Moreover, the apparatus can easily be dismantled and transported from one location to another and set up at a minimum of expense.

Obviously, the invention is not restricted to the particular embodiment thereof herein shown and described.

What is claimed is:

1. For use in a hot water heating system for providing hot water for sulphur mining or the like of the class wherein preheated feed water is fed under pressure to a heating tank where it is heated by a submerged burner in the tank, with the flue gas from the heating tank passing through a heater and after being heated employed to drive the motor which operates an air compressor supplying compressed air to the submerged burner with the exhaust gas from the motor employed to preheat the feed water; the combination with said heating tank of means for removing substantially all condensable water vapor from and regulating the temperature of the flue gases prior to their entry into said heater, including a stripper tank positioned above said heating tank, said stripper tank comprising an elongated upright cylindrical vessel having a circular grid mounted therein; a plurality of short upright, open-ended cylindrical tubes positioned in said tank and supported by said grid, said tubes being arranged into a plurality of superposed layers with the tubes in the respective layers arranged in staggered relation to form tortuous passageways through the layers of tubes; a spray head extending laterally into said stripper tank across the uppermost layer of said tubes and connected to the source of preheated feed water; a pipe connecting the bottom end of said stripper tank to the upper end of said heating tank for the passage of feed water and flue gases therethrough; and a pipe connecting the top of said stripper tank to said heater.

2. Apparatus as set forth in claim 1, including an upper circular grid mounted in said stripper tank and positioned above said spray head; and a demister supported by said upper grid comprising a wire mesh wound into a pancake shape.

3. Apparatus as set forth in claim 1, including a spray head extending laterally into said heating tank adjacent its upper end and connected to the pipe supplying preheated feed water to said stripper tank; and valve means for controlling the flow of water into said stripper tank and said heating tank whereby the temperature of the flue gas passing through the pipe connecting the top of said stripper tank to said heater can be regulated.

References Cited in the file of this patent

UNITED STATES PATENTS

| | | |
|---|---|---|
| 2,080,713 | Hayes | May 18, 1937 |
| 2,539,992 | Cover | Jan. 30, 1951 |
| 2,587,416 | Vedder | Feb. 26, 1952 |
| 2,647,370 | Miller | Aug. 4, 1953 |
| 2,764,234 | Rauh | Sept. 25, 1956 |
| 2,781,635 | Brogdon | Feb. 19, 1957 |